(12) United States Patent
Krutzer et al.

(10) Patent No.: US 9,988,500 B2
(45) Date of Patent: *Jun. 5, 2018

(54) PROCESS FOR THE PREPARATION OF AN AQUEOUS EMULSION OF A MIDBLOCK SULFONATED BLOCK COPOLYMER

(71) Applicant: KRATON POLYMERS U.S. LLC, Houston, TX (US)

(72) Inventors: Bert Krutzer, Duiven (NL); Coen De Oude, Houston, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/300,863

(22) PCT Filed: Apr. 1, 2015

(86) PCT No.: PCT/US2015/023863
§ 371 (c)(1),
(2) Date: Sep. 30, 2016

(87) PCT Pub. No.: WO2015/153750
PCT Pub. Date: Oct. 8, 2015

(65) Prior Publication Data
US 2017/0022329 A1    Jan. 26, 2017

(30) Foreign Application Priority Data

Apr. 2, 2014   (NL) .................................... 2012550

(51) Int. Cl.
*C08J 3/07* (2006.01)
(52) U.S. Cl.
CPC ............. *C08J 3/07* (2013.01); *C08J 2353/00* (2013.01)
(58) Field of Classification Search
CPC .................................. C08J 3/07; C08J 2353/00
See application file for complete search history.

(56) References Cited

U.S. PATENT DOCUMENTS

| 5,336,712 A | 8/1994 | Austgen, Jr. et al. |
| 5,688,856 A | 11/1997 | Austgen, Jr. et al. |
| 2003/0176582 A1 | 9/2003 | Bening et al. |
| 2007/0232747 A1 | 10/2007 | Willis et al. |
| 2013/0102213 A1 | 4/2013 | Dubois |
| 2013/0108880 A1 | 5/2013 | Tan et al. |
| 2013/0240438 A1 | 9/2013 | Willis et al. |
| 2014/0069624 A1 | 3/2014 | Blackwell et al. |

FOREIGN PATENT DOCUMENTS

| EP | 1852928 B1 | 11/2011 |
| EP | 2242137 B1 | 12/2014 |
| TW | 201323465 A1 | 6/2013 |
| TW | 201341458 A1 | 10/2013 |
| WO | 2007/010042 A1 | 1/2007 |
| WO | 2007010039 A1 | 1/2007 |
| WO | 2009/137678 A1 | 11/2009 |
| WO | 2012/050740 A1 | 4/2012 |
| WO | 2012054325 A1 | 4/2012 |
| WO | 2013138146 A1 | 9/2013 |
| WO | 2015/157065 A1 | 10/2015 |

OTHER PUBLICATIONS

Supplementary European Search Report for EP15773616, filed Nov. 1, 2015.
Hayward, Ryan C., and Pochan, Darrin J., Tailored Assemblies of Block Copolymers in Solution: It Is All about the Process, Macromolecules, 2010, 43, 3577-3584.
Taiwan Search Reported for Taiwan patent application No. 104110757, dated Dec. 1, 2015.

*Primary Examiner* — Robert Jones, Jr.
(74) *Attorney, Agent, or Firm* — Jessica Zimberlin Eastman; Cantor Colburn LLP

(57) ABSTRACT

The present invention concerns aqueous emulsions and a process for preparing aqueous emulsions of a midblock sulfonated styrenic block copolymer comprising at least two non-sulfonated polymer end-blocks A and at least one sulfonated block B, comprising the steps of providing a cement of a midblock sulfonated styrenic block copolymer in the apolar solvent, mixing the cement with a co-solvent to form a mixture, emulsifying the mixture in the absence of a surfactant with water to produce an emulsion, and removing the hydrocarbon solvent and any optional co-solvent from the emulsion to produce the aqueous emulsion. The resulting emulsion of the midblock sulfonated styrenic block copolymer has relatively small particle diameters.

12 Claims, No Drawings

US 9,988,500 B2

PROCESS FOR THE PREPARATION OF AN AQUEOUS EMULSION OF A MIDBLOCK SULFONATED BLOCK COPOLYMER

CROSS-REFERENCE TO RELATED APPLICATIONS

This application is the National Phase of International Application PCT/US2015/023863 filed Apr. 1, 2015 which designated the U.S. and which claims priority to Netherlands App. Serial No. 2012550 filed Apr. 2, 2014. The noted applications are incorporated herein by reference.

TECHNICAL FIELD

This invention concerns a process for the preparation of an aqueous emulsion of a midblock sulfonated block copolymer. More in particular, it concerns emulsions of midblock sulfonated block copolymers with relatively small particle diameters. It also concerns the aqueous emulsion so prepared.

BACKGROUND ART

Midblock sulfonated block copolymers are known. Typically, they are sulfonated polymers based on styrene and/or t-butyl styrene with the former predominantly used in a midblock, that is subsequently sulfonated and the latter in the endblocks, that resist sulfonation. These polymers are in a solid state in the presence of water and have both high water transport properties and sufficient wet strength. These polymers are known to have excellent barrier properties.

From WO2007010039 a midblock sulfonated styrenic block copolymer is known. This block copolymer is based on a block copolymer that comprises at least two polymer end blocks A and at least one polymer interior block B wherein each A block is a polymer block resistant to sulfonation and each B block is a polymer block susceptible to sulfonation, and wherein said A and B blocks do not contain any significant levels of olefinic unsaturation.

Such polymers are now commercially available for instance under the trademark Nexar® from Kraton Polymers. The typical structure of a Nexar molecule is a pentablock consisting of two poly(t-butylstyrene) (tBS) blocks, two poly(ethylene/propylene) (EP) blocks (hydrogenated polyisoprene), and in the middle a partly sulfonated polystyrene (sPS) block.

Such midblock sulfonated block copolymers are typically delivered to customers as a solution of about 10% in a combination of heptane and cyclohexane. For some customers this poses a problem because they are not used to handling this type of solvent and do not have adequate ventilation and disposal systems in place. Organic solvents may cause various handling problems due to the high volatility and low flame point of such solvents. The possibility to deliver such polymers as an aqueous emulsion would be a solution. Moreover, a waterborne system is more environmental friendly. Preparing a suitable aqueous emulsion, however, is not without its own problems.

EP2242137 and EP1852928 concern a membrane-electrode assembly for polymer electrolyte fuel cells. They employ a block copolymer comprising a polymer block (A) having ion-conductive groups and a polymer block (B) having no ion-conductive groups, both polymer blocks phase-separated from each other, polymer block (a) forms a continuous phase. In paragraph [0047] of EP2242137 it describes methods of emulsifying the block copolymer. This is described and illustrated for end-block sulfonated block copolymers only. End-block sulfonated block copolymers behave differently from the midblock sulfonated block copolymers. A method for preparing an aqueous dispersion of a midblock sulfonated block copolymer is therefore not disclosed in EP2242137 or EP1852928.

Unfortunately, midblock sulfonated block copolymers frequently require the presence of surfactants to prepare a stable emulsion. This adds in cost, complicates matters (foaming!) and may adversely affect the applicability of the aqueous emulsion.

Surfactants are compounds that lower the surface tension (or interfacial tension) between two liquids or between a liquid and a solid. Surfactants may act as detergents, wetting agents, emulsifiers, foaming agents, and dispersants.

Surfactants are usually organic compounds that are amphiphilic, meaning they contain both hydrophobic groups (their tails) and hydrophilic groups (their heads). Therefore, a surfactant contains both a water insoluble (or oil soluble) component and a water soluble component. Surfactants will diffuse in water and adsorb at interfaces between air and water or at the interface between oil and water, in the case where water is mixed with oil. The water-insoluble hydrophobic group may extend out of the bulk water phase, into the air or into the oil phase, while the water-soluble head group remains in the water phase. This alignment of surfactants at the surface modifies the surface properties of water at the water/air or water/oil interface. (Wikipedia, 2014) To avoid any doubt, midblock sulfonated styrenic block copolymers are not considered surfactants. Rather, surfactants are compounds with a mass typically less than 5000 Dalton.

Ideally it should be possible to produce stable emulsions without surfactant, i.e., emulsions wherein the midblock sulfonated block copolymers remain finely dispersed as small particles, e.g. with an average particle size that is no greater than 2 micrometer, in water for a reasonable period of time. For commercial purposes this means a stable emulsion for at least 1 year. Under laboratory testing procedures this means that the emulsion is stable for at least 3 days without collapse or coalescence of the polymer particles. This should be possible, even when using a hydrocarbon solvent wherein the preceding polymerization has been performed. Expressed differently, when using a typical solution of a midblock sulfonated styrenic block copolymer dissolved in a hydrocarbon solvent such as cyclohexane, heptane or a mixture thereof, it would be ideal if a stable emulsion can be prepared without having to rely on an added surfactant.

SUMMARY OF THE INVENTION

The present invention provides a process for preparing an aqueous emulsion of a midblock sulfonated styrenic block copolymer comprising at least two non-sulfonated polymer end-blocks A and at least one sulfonated block B, comprising the following steps:
  a) providing a cement of said midblock sulfonated styrenic block copolymer in an apolar solvent, wherein the apolar solvent is a hydrocarbon compound with a boiling point of 49 to 99° C. or mixture of such compounds;
  b) mixing the cement of step a) with a co-solvent to form a mixture;
  c) emulsifying the mixture of step b), in the absence of an surfactant, with water to produce an emulsion;

d) removing the hydrocarbon solvent and optionally the co-solvent from the emulsion to produce the aqueous emulsion, wherein the apolar solvent has a Hansen polarity parameter (δp) smaller than 2.0 (expressed in √MPa), wherein the co-solvent is a polar aprotic solvent or polar protic solvent with a Hansen polarity parameter (δp) in the range of 2.8 to 15, preferably in the range of 5.0 to 12, and a Hansen hydrogen bonding parameter (δh) in the range of 4.0 to 27 (expressed in √MPa). Preferably, the co-solvent has a boiling point of at most 99° C., whereby an aqueous emulsion may be provided with little or no (organic) solvents.

The co-solvent may be removed, albeit that trace amounts (up to 1500 ppm) will remain. Co-solvent may also be left in the emulsion by purpose, to allow the co-solvent to improve the film forming properties of the emulsion. The emulsion made by the process of the invention is therefore different from an emulsion made without a co-solvent. Accordingly, the present invention provides an aqueous emulsion of a midblock sulfonated styrenic block copolymer comprising at least two non-sulfonated polymer end-blocks A and at least one sulfonated block B, having a solids content in the range of from 10 to 30, suitably from 10 to 15% by mass calculated on the mass of the emulsion, wherein the average particle size of the particles of the midblock sulfonated styrenic block copolymer is at most 2.0 μm, containing up to 1500 ppm calculated on the solid content of the emulsion of a co-solvent, wherein the co-solvent is a polar aprotic solvent or polar protic solvent with a Hansen polarity parameter (δp) in the range of 2.8 to 15, preferably 5.0 to 12, and a Hansen hydrogen bonding parameter (δh) in the range of 4.0 to 27 (calculated in √MPa).

Thus the inventors found that by making use of specific co-solvents during emulsification, the average particle diameter of aqueous midblock sulfonated styrenic block copolymer emulsions could be decreased. The final diameter depends on the type and amount of co-solvent added.

DESCRIPTION OF THE EMBODIMENTS

Accordingly, the present invention broadly comprises emulsions of midblock sulfonated styrenic block copolymers that are solids in water. The block copolymers comprise at least two non-sulfonated polymer end-blocks A, and at least one interior styrenic polymer block B carrying sulfonyl groups and/or derivatives thereof. Optionally the midblock sulfonated styrenic block copolymer may comprise one or more interior polymer blocks D that have a glass transition temperature of less than 20° C. Such midblock sulfonated styrenic block copolymers are known from WO2007010039, and EP2242137 and others.

The expression "resistant to sulfonation" is sometimes used with respect to the end blocks A. This means that less than about 10 mole % of all the available sulfonyl groups in the sulfonated styrenic block copolymer are in the A blocks. The expression "resistant to sulfonation" if used with respect to the blocks D, will mean that less than about 15 mole % of all the available sulfonyl groups in the sulfonated styrenic block copolymer are in the D blocks.

The expression block copolymer refers to a polymer having distinguishable blocks. These blocks have different properties. Typically, the block copolymer has multiple, distinct glass transition temperatures. An important difference between end-block sulfonated block copolymers and midblock sulfonated styrenic block copolymers is that in the latter the A blocks can provide a hydrophobic matrix, even if the midblock sulfonated block copolymer is in contact with water. The polymer behaves as if it is cross-linked. This is important for the stability of e.g. membranes made from such sulfonated block copolymers. The interior B block on the other hand will be hydrophilic as a result of the sulfonyl groups or the derivatives thereof that are present in this block. The D blocks, if any, may have properties ranging from hydrophobic to hydrophilic, provided, they do not adversely affect the stability of the articles made of the sulfonated block copolymers when in contact with water. Preferably, they are hydrophobic.

The midblock sulfonated block copolymers may be linear or branched. Preferred structures have the general configuration A-B-A, (A-B)$_n$(A), (A-B-A)$_n$, (A-B-A)$_n$X, (A-B)$_n$X, A-B-D-B-A, A-D-B-D-A, (A-D-B)$_n$(A), (A-B-D)$_n$(A), (A-B-D)$_n$X, (A-D-B)$_n$X or mixtures thereof, where n is an integer from 2 to about 30, X is coupling agent residue and A, B and D are as defined hereinbefore.

A distinguishing feature of block copolymers which have been selectively sulfonated in an interior block is that they can be formed into objects having a useful balance of properties that have heretofore been unachievable, including strength even when equilibrated with water, water vapour transport behaviour, dimensional stability, and processability. The hydrophobic blocks and their position at the ends of the block copolymer chain contribute to the wet strength, dimensional stability and processability of these polymers and objects formed from them. The sulfonated block(s) positioned in the interior of the copolymer allow effective water vapour transport. The combined properties afford a unique material ideally suitable for coatings.

The sulfonated styrenic block copolymers may be made from corresponding unsulfonated styrenic block copolymers by sulfonation (reaction with $SO_3$ or with a $C_2$ to $C_8$ acyl sulfate, as described in WO200710039, incorporated herein by reference). These unsulfonated styrenic block copolymers may be defined by the same structural formulae, wherein A and D have the same meaning (since A is resistant to sulfonation and D preferably is resistant to sulfonation), but wherein B', instead of B, is the corresponding block before sulfonation.

Most preferred structures are either the linear A-B-A, (A-B)$_2$X, (A-B-D)$_2$X and (A-D-B)$_2$X structures or the radial structures (A-B)$_n$X and (A-D-B)$_n$X where n is 3 to 6. The block copolymers prior to sulfonation are typically made via anionic polymerization, cationic polymerization or Ziegler-Natta polymerization. Preferably, these unsulfonated block copolymers are made via anionic polymerization. It is recognized that in any polymerization, the polymer mixture will include a certain amount of A-B diblock copolymer, in addition to any linear and/or radial polymers. The most preferred structure is A-D-B-D-A, made by sulfonating the corresponding A-D-B'-D-A.

Preferably
a) each A block independently is a polymer block having an apparent number average molar mass between 1,000 and 60,000, more preferably between 5,000 and 40,000, still more preferably between 7,000 and 20,000; and/or
b) each D block, if present, independently is a polymer block having an apparent number average molar mass between 1,000 and 60,000, more preferably between 2,000 and 40,000, still more preferably between 5,000 and 20,000, and/or
c) each B block independently is a polymer block having an apparent number average molar mass between 10,000 and 300,000, more preferably between 15,000 and 200,000, still more preferably between 19,000 and 100,000.

For midblock sulfonated styrenic block copolymers wherein each A block has an apparent number average molar mass below 1,000 said blocks may be too small to ensure sufficient strength. For midblock sulfonated styrenic block copolymers wherein each A block has an apparent number average molar mass above 60,000 said blocks may be too big in respect to the blocks B. In that case the block copolymer may have insufficient conductivity. It may also be more difficult to process as a result of the increased overall molecular weight.

As used in this specification and claims, the term "molar mass" refers to polystyrene equivalent, or apparent, molar mass of the polymer or block of the copolymer, measured with gel permeation chromatography (GPC) using polystyrene calibration standards, such as is done according to ASTM D5296-11. GPC is a well-known method wherein polymers are separated according to molecular size, the largest molecule eluting first. The chromatograph is calibrated using commercially available polystyrene molar mass standards. The detector used is preferably a combination ultraviolet and refractive index detector. The molar mass expressed herein is measured at the peak of the GPC trace.

Preferably, the sulfonated styrenic block copolymer has a B block content in the range of 10 to 85 percent by mass (% m), preferably in the range of 20 to 60% m, more preferably 25 to 50% m, calculated on the mass of the sulfonated block copolymer. If the content is less than 10% m, then the conductivity will be too low. If the content is greater than 85% m then the block copolymer may have insufficient strength. In the preferred ranges an improved balance will be found between conductivity and strength. Block copolymers within these ranges will be insoluble in water and non-dispersible in water. The hydrophobic units of the end blocks and optional D blocks contribute to the block copolymer's insolubility. Furthermore, if the B block mass content approaches high values where the sulfonated block copolymers become soluble, hydrophobicity of the entire styrenic block copolymer can be adjusted by incorporating hydrophobic monomer units into the interior blocks, including A blocks as well as B blocks.

An important feature of the sulfonated styrenic block copolymers used in the emulsions of the current invention is that they have sufficient sulfonic groups per molecule (which definition includes salts and acid derivatives that allow transport of water). Preferably the sulfonated block copolymer has a content of sulfonic groups in the range of 0.2 to 4.0, preferably 0.3 to 3.0, more preferably 0.5 to 2.5 mmole per gram polymer. This is also referred to as Ion Exchange Capacity in sulfonic groups by mass. (The IEC value in meq/g, which is found by potentiometric titration, and mmole/g coincide, since the charge of the sulfonyl group is one).

The problem of forming stable emulsions with finely dispersed polymer particles underlying the current invention is particularly problematic for midblock sulfonated block copolymers with an IEC of less than 2.5 mmole per gram polymer, more preferably less than 1.5 mmole per gram polymer. Thus, the new process is preferably applied with respect to midblock sulfonated styrenic block copolymers having an IEC in the range of 0.2 to 2.0, more preferably in the range of 0.3 to 1.5, more preferably still in the range of 0.5 to 1.25 mmole per gram polymer.

With respect to the sulfonated styrenic block copolymers that are made from an unsulfonated styrenic block copolymer, preferably each A block independently is made of monomers that resist sulfonation. Such monomers may be selected from: (i) para-substituted styrenes; (ii) ethylene; (iii) alpha olefins of 3 to 18 carbon atoms; (iv) 1,3-cyclodienes; (v) conjugated dienes; (vi) acrylic esters, (vii) methacrylic esters, and (viii) mixtures of monomers (i) to (vii). Where sulfonation conditions are selected that will react with any residual olefinic unsaturation (e.g., in case of block copolymers based on diene monomers in the endblocks), the olefinic unsaturation is preferably removed, for instance by hydrogenation. To ensure the blocks A provide a strong matrix, preferably the blocks have a glass transition temperature in excess of 30° C. For instance, if diene monomers are used, then preferably they are polymerized in a 1,4-fashion. More preferably, each A block comprises a polymer or a copolymer of a para-substituted styrene.

The para-substituted styrenes that are considered suitable monomers may be selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrenes are para-t-butylstyrene and para-methylstyrene, with para-t-butylstyrene (tBS) being most preferred. Monomers may be mixtures of monomers, depending on the particular source. It is desired that the overall purity of the para-substituted styrenes be at least 90% m, preferably at least 95% m, and even more preferably at least 98% m of the desired para-substituted styrene used as monomer.

Other preferred monomers that may form the basis of an A block include ethylene; propylene, butylene, hexane or octane; 1,3-cyclohexadiene, 1,3-cycloheptadiene and 1,3-cyclooctadiene; 1,3-butadiene and/or isoprene (preferably hydrogenated); and various (meth)acrylic esters.

If the B block is made from sulfonated monomers, then the A blocks may also comprise other monomers that would normally undergo sulfonation. Preferably the sulfonated polymer is made by sulfonating an unsulfonated block copolymer, and therefore preferably the A blocks contain little or no monomers that would normally undergo sulfonation.

Thus, the A blocks may contain up to 15 mole percent of the vinyl aromatic monomers mentioned for incorporation in the B blocks. In some embodiments, the A blocks may contain up to 10 mole percent, preferably they will contain only up to 5 mole percent, and particularly preferably only up to 2 mole percent of the vinyl aromatic monomers mentioned for incorporation in the B blocks.

However, in the most preferred embodiments, the A blocks will contain no vinyl aromatic monomers mentioned for incorporation in the B blocks. Accordingly, the sulfonation level in the A blocks will be 0 or close to 0 (expressed in mole percent of the total monomers in the A block). In the preferred embodiments therefore the A blocks will provide a strong hydrophobic matrix even if the sulfonated styrenic block copolymer is in contact with water.

The sulfonated styrenic block copolymer may optionally comprise one or more D blocks, providing elasticity. Preferably, said D blocks comprise a polymer or copolymer or a hydrogenated polymer or copolymer of a conjugated diene or a mixture of the conjugated diene with a copolymerizable monomer. The conjugated diene is preferably selected from isoprene, 1,3-butadiene and mixtures thereof, of which between 20 and 80 mole percent is built into the (co)polymer in a 1,2-addition fashion. Most preferably, said D blocks are hydrogenated blocks of polymerized isoprene (EP). Another example of a suitable D block would be an acrylate or silicone polymer. In still another example, the D block would be a polymer of isobutylene.

The advantage of a D block or D blocks is an increased elasticity/toughness of the products made from the sulfonated block copolymer. Whereas the sulfonation level in the A blocks is preferably 0 or close to 0 mole percent, some sulfonation of the D block or D blocks is permissible. The level of sulfonation depends on a number of aspects, amongst others relating to the size of the D block(s) and the size of the A blocks.

Furthermore, the sulfonated styrenic block copolymers comprise at least one B block, wherein each B block is made of sulfonated monomers or monomers that can be sulfonated after polymerisation. Sulfonated monomers, preferably sulfonated styrenic monomers, include the various sulfonylvinylstyrene monomers.

Preferably the sulfonated styrenic block copolymers are made by sulfonating the corresponding unsulfonated styrenic block copolymer wherein the or each B' block is made of monomers that can be sulfonated after polymerisation. These monomers are preferably vinyl aromatic monomers selected from (i) unsubstituted styrene, (ii) ortho-substituted styrenes, (iii) meta-substituted styrenes, (iv) alpha-methylstyrene, (v) 1,1-diphenylethylene, (vi) 1,2-diphenylethylene and (vii) mixtures thereof, with styrene being most preferred. During sulfonation all or part of the vinyl aromatic monomers are sulfonated, resulting in—for instance—sulfonated polystyrene (sPS).

Each B block or B' block may be a homopolymer or copolymer. For instance, this may be a random or tapered copolymer of a sulfonated or unsulfonated vinyl aromatic monomer with other vinyl aromatic monomers and/or with one or more conjugated dienes. These blocks may also have a controlled distribution of monomers, similar to the polymers disclosed in U.S. Published Patent Application No. 2003/0176582, which disclosure is herein incorporated by reference. Use of a copolymer may be advantageous to influence the amount of sulfonic groups in the B blocks. This is particularly advantageous when the sulfonated block copolymer is made by sulfonating selectively the interior block of an unsulfonated block copolymer.

For instance, in the interior block of the unsulfonated styrenic block copolymer used for the preparation of the sulfonated styrenic block copolymer the mole percent of vinyl aromatic monomers which are unsubstituted styrene, ortho-substituted styrene, meta-substituted styrene, alpha-methylstyrene, 1,1-diphenylethylene, and/or 1,2-diphenylethylene in the or each of the interior B' blocks is from 10 to 100 mole percent, preferably from 25 to 100 mole percent, more preferably from 50 to 100 mole percent, even more preferably from 75 to 100 mole percent and most preferably about 100 mole percent.

As for the level of sulfonation, typical levels are where each B block contains one or more sulfonic functional groups. Preferred levels of sulfonation are from 10 to 100 mole percent based on the mole percent of vinyl aromatic monomers which are unsubstituted styrene, ortho-substituted styrene, meta-substituted styrene, alpha-methylstyrene, 1,1-diphenylethylene, and 1,2-diphenylethylene in each B block, more preferably from 20 to 95 mole percent and even more preferably from 30 to 90 mole percent. The level of sulfonation can be determined by titration of a dry polymer sample, which has been redissolved in tetrahydrofuran with a standardized solution of NaOH in a mixed alcohol and water solvent. When the level of sulfonation is below the mentioned limit, then the conductivity is adversely affected. Sulfonation close to 100% may be too much effort to be economically feasible. The preferred ranges provide the more attractive balance in properties and economic feasibility.

With regard to the anionic polymerization process to prepare the styrenic block copolymers, frequently used solvents wherein the block copolymers are dissolved or emulsified to form a cement, are hydrocarbon compounds with a boiling point of 49 to 99° C., with a Hansen polarity parameter ($\delta p$) smaller than 2.0 (expressed in $\sqrt{MPa}$). These apolar solvents, more than polar solvents allow for the preparation of styrenic block copolymers. Typical examples include cyclic alkanes, such as cyclopentane, cyclohexane, cycloheptane, and cyclooctane. Consequently, the midblock sulfonated block copolymers are frequently supplied as a solution using said solvents optionally in admixture with other hydrocarbon solvents such as heptane as fluid. For some customers this poses a problem because they are not used or equipped to handle this type of solvent. The possibility to deliver the midblock sulfonated block copolymer as an emulsion would be a solution. Apart from this, the process by which the emulsion is generated would give the producer of the midblock sulfonated block copolymers the possibility to recover the organic solvents for potential re-use.

The current invention concerns the preparation of an aqueous emulsion, i.e., a mixture of the solid phase and the aqueous phase that are normally immiscible. In this case it concerns a stable emulsion, wherein the solid phase does not separate quickly over time, with fine polymer particles.

Emulsification procedures are well-known and common procedures may be applied in the current invention. Quite some literature has been published about emulsification by high shear. A lot of publications concentrate on separate mechanisms playing a role, e.g. droplet breakup, surface tension, dynamic surface tension. During the process of emulsification, when droplets become smaller, it will become progressively more difficult to decrease the size of the droplets further. Droplet size may also depend on the type of surfactant used, if any. Viscosity can also be of importance. The midblock sulfonated block copolymers of the current invention typically have a relatively high viscosity, making it more difficult to from emulsions with small particle sizes.

The midblock sulfonated block copolymers can be emulsified via indirect or by direct emulsification. With the former procedure water is added to the dissolved polymer, first creating a water in oil emulsion, which after addition of more and more water inverts into an oil in water emulsion.

Direct emulsification may be carried out by adding the dissolved polymer to water while stirring. Initially large particles are formed, which may then be broken down for instance by the high shear. It may be useful that a surfactant is present in the water phase, to lower the interfacial tension between the oil and the water phase, and to provide stabilization of the particles formed. The particle diameters may to a certain extent be influenced by adjusting the shear rate and by changing the surfactant concentration. However, the desire to reduce the average particle diameter remains.

In order to create e.g. a homogeneous film, it is important to create emulsions with small average particle diameters. The smaller the better. The average particle diameter is suitably smaller than about 2.0 micrometer, more suitably smaller than about 1.0 micrometer.

The preferred procedure for preparing emulsions of sulfonated block copolymers is by direct emulsification. Preferably, a solution of the sulfonated block copolymer in a volatile organic solvent (with a boiling temperature below that of water) and water are mixed and turned into an emulsion, typically with the aid of a homogenizer. For instance, for lab scale experiments an Ultra-Turrax™ T25 or T50 may be used; for large-scale experiments a Danfoss™ VLT5000 rotor-stator setup may be used. Interestingly, as described hereafter, the sulfonated block copolymers do not require the presence of a surfactant to create a stable emulsion.

Having mixed the solution of the sulfonated block copolymer and water, next the organic solvent is stripped. This may be at atmospheric pressure, whilst heating above the boiling temperature of the organic solvent used for the preparation of the solution of the sulfonated block copolymer, or at a reduced pressure. For example, for lab scale experiments the solvent may be stripped from an emulsion first at atmospheric pressure at the temperature close to boiling water, followed by a further reduction of the residual solvent in a rotary evaporator setup.

Solids content is the amount of sulfonated block copolymer in the aqueous emulsion, calculated by weight. Preferably, the solids content is as high as feasible, to keep transportation costs low. On the other hand, the emulsion has to remain stable and sufficient fluid to be manageable by the users. Preferably, the resulting emulsion has a solids content in the range of 5 to 70% wt., preferably in the range of 10 to 50% wt.

Moreover, the resulting emulsion has preferably a content of hydrocarbon solvents of less than 5% wt, preferably less than 1% wt.

For the purpose of the present invention, it has been found that the average particle diameter may be reduced in size by a factor of about 4.0 or greater by the presence of a particular co-solvent. This is not merely a dilution effect (which might provide a reduction of size by a factor of less than 2.0).

Surprisingly, it has been found that certain co-solvents have an advantageous effect on the average particle diameter. These co-solvents may be selected on the basis of the Hansen Solubility Parameters.

The Hansen solubility parameter values are based on dispersion bonds ($\delta d$), polar bonds ($\delta p$) and hydrogen bonds ($\delta h$). These contain information about the inter-molecular interactions with other solvents and also with polymers, pigments, nanoparticles, etc. Because numerical values are used, comparisons can be made rationally by comparing numbers. For example, acetonitrile is much more polar than acetone but exhibits slightly less hydrogen bonding.

Typically, the Hansen parameter is expressed in either $\sqrt{MPa}$ or in $\sqrt{cal/ml}$. As indicated, the co-solvent is a polar aprotic solvent or polar protic solvent with a Hansen polarity parameter ($\delta p$) in the range of 2.8 to 15, preferably 5.0 to 12, and a Hansen hydrogen bonding parameter ($\delta h$) in the range of 4.0 to 27 (expressed in $\sqrt{MPa}$).

An extensive list of solvents, albeit expressed in $\sqrt{cal/ml}$, is disclosed on http://www.stenutz.eu/chem/solv24.php?sort=1. A selection thereof has been copied here below, arranged by $\delta p$ and converted to $\sqrt{MPa}$ (multiplied by the factor $\sqrt{4.2}$, i.e., 2.05):

| NAME | CAS NR | $\Delta P$ | $\Delta H$ |
|---|---|---|---|
| cyclohexane | 110-82-7 | 0.0 | 0.2 |
| heptane | 142-82-5 | 0.0 | 0.0 |
| toluene | 108-88-3 | 1.4 | 2.0 |
| decanol | 112-30-1 | 2.7 | 10.0 |
| diethyl ether | 60-29-7 | 2.9 | 5.1 |
| 2-methylpropyl acetate | 110-19-0 | 3.7 | 6.3 |
| butyl acetate | 123-86-4 | 3.7 | 6.3 |
| 2-ethoxyethyl acetate | 111-15-9 | 4.7 | 10.6 |
| 2-butoxyethanol | 111-76-2 | 5.1 | 12.3 |
| ethyl acetate | 141-78-6 | 5.3 | 7.2 |
| 2-butanol | 78-92-2 | 5.7 | 14.5 |
| 2-methyl-1-propanol | 78-83-1 | 5.7 | 16.0 |
| butanol | 71-36-3 | 5.7 | 15.8 |
| tetrahydrofuran | 109-99-9 | 5.7 | 8.0 |
| 2-propanol | 67-63-0 | 6.1 | 16.4 |
| 1-propanol | 71-23-8 | 6.8 | 17.4 |
| methyl acetate | 79-20-9 | 7.2 | 7.6 |
| 3-pentanone | 96-22-0 | 7.6 | 4.7 |
| acetic acid | 64-19-7 | 8,0 | 15.5 |
| ethanol | 64-17-5 | 8.8 | 19.4 |
| 2-butanone ("MEK") | 78-93-3 | 9.0 | 6.0 |
| 2-ethoxyethanol | 110-80-5 | 9.2 | 14.3 |
| 1,2-propanediol | 57-55-6 | 9.4 | 23.3 |
| 2-propanone | 67-41-1 | 10.4 | 7.0 |
| ethanediol | 107-21-1 | 11.0 | 26.1 |
| N,N-dimethylacetamide | 127-19-5 | 11.5 | 10.2 |
| methanol | 67-56-1 | 12.3 | 20.7 |
| N-methylpyrrolidon | 872-50-4 | 12.3 | 7.2 |
| N,N-dimethylformamide | 68-12-2 | 13.7 | 11.3 |
| diethylene glycol | 111-46-6 | 14.7 | 20.5 |
| water | 7732-18-5 | 16.0 | 42.3 |

Suitable co-solvents are therefore those having a $\delta p$ similar or greater than diethyl ether, preferably similar or greater than 2-butoxyethanol and similar or smaller than diethylene glycol. Note moreover that the co-solvent should preferably also have a boiling point below that of water.

The most important feature of the co-solvent is the polarity component, $\delta p$. Preferably, this is in the range of from 5.1 (2-butoxyethanol) to 11.5 (N,N-dimethylacetamide). This includes, for instance, tetrahydrofurane (5.7); 1-propanol (6.8); 2-butanone (9.0). These co-solvents provide surprisingly good results, with best results being achieved with 1-propanol.

The effective amount of co-solvent depends on the solids content and on the selection of hydrocarbon solvent used in the cement. Thus, in case the content of midblock sulfonated styrenic block copolymer is low, e.g., 5% m on the cement, then only a minor amount of co-solvent is needed, e.g., 3% m on the mixture of cement and co-solvent. In case the solids content is high, then a greater amount of co-solvent is needed; up to 60% m of the mixture of cement and co-solvent. For instance, in a 12% m solution of a midblock sulfonated styrenic block copolymer sufficient 2-butanone may be added that the final mixture has a 8% m solids content, with a mass ratio between hydrocarbon solvent and co-solvent of 2:3. Preferably, the mass ratio between the hydrocarbon solvent and the co-solvent is in the range of 10:1 to 1:2, preferably 5:1 to 2:3, more preferably 3:1 to 1:1.

In addition to the co-solvent and the optional detergent, it may be useful to include special solvents (non-volatile organic compounds as defined in 1999/13/EC and 2004/42/CE in Europe, and/or non-hazardous air pollutants as defined in the US Clean Air Act) as coalescing agents that lower the Minimum Film Forming Temperature such as N-methylpyrrolidon, tripropylene glycol n-butyl ether (Arcosolv™ TPNB) various glycol ethers, glycol ether esters, or ester alcohols (e.g., Eastman™ EEH) and many other commercially available solvents, which thereby help to achieve a uniform film, coating or other article.

Together or separate from the above coalescing agents, various other additives may be added to the emulsion in their common amounts. Such additives include pigments, antioxidants, stabilisers, antifreeze, biocides, catalysts, etc.

The current invention also concerns a film cast from the emulsion defined above, as well as a method for casting the film. The method for casting the film comprises casting and drying said emulsion, wherein a coalescing agent is used when drying the film of the emulsion and/or wherein the temperature is increased to above the minimum film forming temperature. The current invention also concerns a membrane made from a film cast from the emulsion defined above, as well as a coating made from the inventive emulsion.

INDUSTRIAL APPLICATION

The emulsions may be used, for instance, for the preparation of moisture permeable membranes and coatings. These may find use in for instance fuel cells, all separation equipment wherein membranes are used and in clothing, energy recovery ventilation, water purification.

The emulsions may also be used for other articles.

Examples Illustrating the Invention

Emulsions were prepared using the following materials:

| | |
|---|---|
| MD9100 | A sulfonated styrenic block copolymer pentablock copolymer with a structure tBS-EP-sPS-EP-tBS, wherein the tBS blocks each have an average MW of about 10,000, the EP blocks each have an average MW of about 12.000 and the interior sPS block has an average MW of about 22.000, with an ion exchange capacity (IEC) of 1.0 mmole/g. (15.0 % m solids in an apolar solvent mixture of 1:1 cyclohexane/heptane) |
| X100 | $C_{14}H_{22}O(C_2H_4O)_{9.5}$, a nonionic surfactant sold under the trademark Triton ™ which has a hydrophilic polyethylene oxide group (on average it has 9.5 ethylene oxide units) and a hydrocarbon lipophilic or hydrophobic group. |
| SDS | Sodium dodecylsulfate ($C_{12}H_{25}SO_4Na$), an anionic surfactant |
| MEK | Methylethylketone or 2-butanone (technical grade, min 99%) |
| THF | Tetrahydrofuran (technical grade, min 99%) |
| Xylene | Dimethylbenzene (isomeric mixture, min 99%) |
| Toluene | Methylbenzene (technical grade, min 99%) |
| 1-propanol | Technical grade, min 99%) |

Equipment used in the experiments was an Ultra-Turrax™ T25 or T50. A Combimag RCT water bath from IKA was used, as well as a rotovap RV05, also from IKA.

The solids content of the emulsions was determined by drying a sample in an oven (Gallenkamp Plus oven) at 130° C. for 15 minutes. The average particle size diameter was determined using a Beckman Coulter LS230 laser diffraction particle size analyzer. Residual solvent content of the emulsion was measured by GC head space, using 2,2-dimethylbutane as internal standard (3.170 gram in 1 liter THF). The Trace GC Ultra head space gas chromatograph was from Interscience.

Example 1, Comparative 20 grams of MD9100 solution were mixed with 30 grams of water in the T25 at 13500 rpm. After stripping off the solvent under reduced pressure at elevated temperature the midblock sulfonated block copolymer quickly coagulated. A stable emulsion was not possible.

Example 2a, b, Comparative

Experiment 1 was repeated. 100 grams of MD9100 solution were mixed with a substantial amount of surfactant (1 grams of X100, or 1 grams of SDS respectively), and 150 grams of water in the T50 at 9500 rpm. After stripping off the solvent under reduced pressure at elevated temperature a stable emulsion was obtained with a solids content of 12% m and having an average particle diameter of 2.75 micrometer in the case of SDS, and 20% m and 1.02 micrometer when Triton X100 was used. It should be realized that the surfactant remains in the system and thus affects the properties of the final product.

Example 3a, b, Comparative

Experiment 1 was repeated. 20 grams of MD9100 solution were mixed with 7.5 grams of an apolar solvent (cyclohexane, or toluene), and 30 grams of water in the T25 at 13500 rpm. The results after stripping off the solvent and the majority of the co-solvent under reduced pressure at elevated temperature are shown in the below Table. It can be seen that a stable emulsion may be obtained by dilution (experiment 3a) or use of an apolar solvent. However, the results are not nearly good enough.

Example 4-6, in Accordance with the Invention

Experiment 1 was repeated. 20 grams of MD9100 solution were mixed with 7.5 grams of a co-solvent (MEK, THF, 1-propanol), and 30 grams of water in the T25 at 13500 rpm. After stripping off the solvent and the majority of the co-solvent under reduced pressure at elevated temperature a stable emulsion was obtained with a solids content and having an average particle diameter of as shown in the table below. However a proper, stable emulsion with an acceptable average particle diameter is achieved with a co-solvent meeting the Hansen requirements as defined in this specification.

| Example | Polymer | Co-solvent (amount in %m) | Stable (Av. Particle diameter, μm) |
|---|---|---|---|
| 1 | MD9100 | None | No |
| 2a | MD9100 | None (X100) | Yes (1.02) |
| 2b | MD9100 | None (SDS) | Yes (2.76) |
| 3a | MD9100 | cyclohexane (27%) | Yes (5.6) |
| 3b | MD9100 | Toluene (27%) | Yes (3.7) |
| 4 | MD9100 | MEK (27cYo) | Yes (1.7) |
| 5 | MD9100 | THF (27%) | Yes (1.9) |
| 6 | MD9100 | 1-propanol (27%) | Yes (0.7) |

The results above illustrate that the presence of a co-solvent has a very positive effect on the stability of the aqueous emulsion and on the average particle diameter. With X100 excellent results are achieved, but at the detriment of residual X100 in the product.

The most preferred co-solvent is 1-propanol. This co-solvent even out-performs X100.

The invention claimed is:

1. A process for preparing an aqueous emulsion of a midblock sulfonated styrenic block copolymer comprising at least two non-sulfonated polymer end-blocks A and at least one sulfonated block B, comprising the following steps:
   a) providing a cement of said midblock sulfonated styrenic block copolymer in an apolar solvent, wherein the apolar solvent is a hydrocarbon compound with a boiling point in the range of 49 to 99° C. or mixture of such compounds;
   b) mixing the cement of step a) with a co-solvent to form a mixture;

c) emulsifying the mixture of step b), in the absence of a surfactant, with water to produce an emulsion;

d) removing the hydrocarbon solvent and optionally the co-solvent from the emulsion to produce the aqueous emulsion, wherein the apolar solvent has a Hansen polarity parameter ($\delta p$) smaller than 2.0 (expressed in $\sqrt{MPa}$), and the co-solvent is a polar aprotic solvent or polar protic solvent with a Hansen polarity parameter ($\delta p$) in the range of 2.8 to 15, and a Hansen hydrogen bonding parameter ($\delta h$) in the range of 4.0 to 27 (expressed in $\sqrt{MPa}$).

2. The process of claim 1, wherein the co-solvent has a Hansen polarity parameter ($\delta p$) in the range of 5.0 to 12 (expressed in $\sqrt{MPa}$).

3. The process of claim 1, wherein the co-solvent is selected from MEK, 1-propanol, or THF.

4. The process of claim 1, wherein the co-solvent has a boiling point of at most 99° C.

5. The process of claim 1, wherein the midblock sulfonated block copolymers are either linear or branched, optionally having the general configuration A-B-A, (A-B)$_n$(A), (A-B-A)$_n$, (A-B-A)$_n$X, (A-B)$_n$X, A-B-D-B-A, A-D-B-D-A, (A-D-B)$_n$(A), (A-B-D)$_n$(A), (A-B-D)$_n$X, (A-D-B)$_n$X or mixtures thereof, where n is an integer from 2 to about 30, X is a coupling agent residue, wherein A represents the non-sulfonated styrenic polymer end-block, B represents the interior styrenic polymer block carrying sulfonyl groups and/or derivatives thereof, and D represents an interior polymer block D that has a glass transition temperature of less than 20° C.

6. The process of claim 5, wherein the midblock sulfonated block copolymer is linear and has the structures A-B-A, (A-B)$_2$X, (A-B-D)X, (A-D-B)$_2$X, or a mixture thereof structures or is radial and has the structures (A-B)$_n$X, (A-D-B)$_n$X, or a mixture thereof, where n is 3 to 6.

7. The process of claim 5, wherein
a) each A block independently is a polymer block having an apparent number average molar mass between 1,000 and 60,000; and/or
b) each D block, if present, independently is a polymer block having an apparent number average molar mass between 1,000 and 60,000; and/or
c) each B block independently is a polymer block having an apparent number average molar mass between 10,000 and 300,000, wherein the term "molar mass" refers to polystyrene equivalent, or apparent, molar mass of the polymer or block of the copolymer, measured with gel permeation chromatography (GPC) using polystyrene calibration standards, according to ASTM D5296-11.

8. The process of claim 1, wherein the midblock sulfonated block copolymers has an Ion Exchange Capacity (IEC) in the range of 0.2 to 2.0.

9. The process of claim 1, wherein the mass ratio between the hydrocarbon solvent and the co-solvent is in the range of 10:1 to 1:2.

10. The process of claim 1, wherein the cement has a solids content between 5 to 60% by mass.

11. The process of claim 1, wherein in step (a) a homogenizer is used.

12. An aqueous emulsion of a midblock sulfonated styrenic block copolymer comprising at least two non-sulfonated polymer end-blocks A and at least one sulfonated block B, having a solids content in the range of from 10-30% by mass calculated on the mass of the emulsion, wherein the average particle size of the particles of the midblock sulfonated styrenic block copolymer as determined by laser diffraction spectroscopy is at most 2.0 μm, containing up to 1500 ppm calculated on the mass of the emulsion of a co-solvent, wherein the co-solvent is a polar aprotic solvent or polar protic solvent with a Hansen polarity parameter ($\delta p$) in the range of 2.8-15, and a Hansen hydrogen bonding parameter ($\delta p$) in the range of 4.0 to 27 (calculated in $\sqrt{MPa}$).

* * * * *